United States Patent
Caso et al.

(10) Patent No.: US 6,707,916 B1
(45) Date of Patent: Mar. 16, 2004

(54) MITIGATION OF FALSE CO-CHANNEL UPLINK RECEPTION IN A PROCESSING SATELLITE COMMUNICATION SYSTEM USING SCRAMBLING SEQUENCES

(75) Inventors: Gregory S. Caso, Hermosa Beach, CA (US); Stuart T. Linsky, San Pedro, CA (US); David A. Wright, Solana Beach, CA (US); Donald C. Wilcoxson, Fort Wayne, IN (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/270,567

(22) Filed: Mar. 16, 1999

(51) Int. Cl.⁷ ............................. H04K 1/00; H04L 9/00
(52) U.S. Cl. ..................................... 380/270; 380/258
(58) Field of Search ................................ 380/270, 258

(56) References Cited

U.S. PATENT DOCUMENTS

| | | | |
|---|---|---|---|
| 4,860,352 A | * 8/1989 | Laurance et al. | 380/258 |
| 5,113,443 A | * 5/1992 | Brockman | 380/34 |
| 5,270,524 A | * 12/1993 | Ouchi | 235/462.07 |
| 5,742,678 A | * 4/1998 | Dent et al. | 380/270 |
| 6,041,124 A | * 3/2000 | Sugita | 380/270 |

FOREIGN PATENT DOCUMENTS

| | | |
|---|---|---|
| EP | 0000039 | 12/1978 |

OTHER PUBLICATIONS

Shiwei Gao and K. M. Wong, *Adaptive Co–Channel Interference Suppression in Mobile Communications Satellite Systems*, Personal, Indoor and Mobile Radio Communications, 1995. PIMRC 1995. Wireless: Merging onto the Information Superhighway, Sixth IEEE International Symposium on Toronto, Ont., Canada 27–29, Sep. 1995, New York, NY, USA, IEEE, US, Sep. 27, 1995, pp. 86–90.

\* cited by examiner

*Primary Examiner*—Gilberto Barron
*Assistant Examiner*—Benjamin E. Lanier

(57) ABSTRACT

A method and apparatus for mitigation of false co-channel uplink reception, also known as show-thru, in an uplink A due to an uplink B at a satellite receiver. The method includes storing multiple scrambling sequences associated with respective individual uplinks, including a scrambling sequence A, receiving uplink A signals at an uplink A receiver, applying scrambling sequence A to the uplink A signals to generate descrambled A data, and then decoding the descrambled A data. The decoding step includes the generation of a decoder failure signal in the event that decoding is unsuccessful, and the method discards the descrambled A data if the decoder failure signal is asserted. Therefore, any show-thru data derived from uplink B will be discarded in the uplink A receiver, and vice versa. The step of applying the scrambling sequence may be effected using an exclusive-or operation.

9 Claims, 4 Drawing Sheets

MITIGATION OF FALSE CO-CHANNEL UPLINK RECEPTION IN A PROCESSING SATELLITE COMMUNICATION SYSTEM USING SCRAMBLING SEQUENCES

BACKGROUND OF THE INVENTION

The present invention relates to mitigation of false co-channel uplink reception (also known as "show-thru") in a satellite communication system. In particular, the present invention relates to the application of cover sequences at earth terminals that allows a receiving satellite to reliably discard show-thru signals.

A multi-beam processing satellite system may transmit and receive numerous beams distinguished by the frequency and polarization of the signals present in the beam. The same frequency, same polarization beams (i.e., the same "color" beams) may be reused in an antenna pattern to provide communications services across a coverage area often hundreds of miles in diameter.

Beam reuse, however, renders the same color beams susceptible to co-channel interference such that a portion of the signal from a beam B is observed in a beam A. Such co-channel interference (CCI) arises primarily because of the practical limitations in implementing an antenna system which, ideally, would provide perfect rejection of same-color signals from other than the desired beam. In practice, however, the coverage provided for beam A inevitably provides some response to signals originating in beam B due to real world limitations in the physical realization of the antenna system. Furthermore, in typical frequency reuse systems, 12 to 16, or more beams of the same color may be reused over a coverage area, correspondingly increasing the potential for CCI.

Processing satellite systems may further employ TDMA (time division multiple access) techniques that permit several user earth terminals to time share a frequency channel by sending short traffic bursts in assigned time slots. These bursts typically exploit powerful error correcting codes to ensure the integrity of the traffic being carried. However, when the time slots in two same-color beams, A & B, are time aligned, a phenomenon known as show-thru may occur.

Specifically, show-thru may occur in beam A when no burst is present in a slot in beam A but a burst is present in the matching channel and slot in beam B. As a result of CCI, the burst from beam B couples (albeit in attenuated form) into the receiving electronics for beam A. Although the signal to noise ratio of this inadvertently coupled signal may be quite low, the error correcting code applied to the burst in beam B improves the likelihood that the burst from B will be regarded as valid by the processor for beam A.

In systems intended for use with the ATM (Asynchronous Transfer Mode) protocol, the inadvertent presence of apparently valid, but actually misinserted cells (due to show-thru bursts) is deleterious since the cell misinsertion rate (CMR) must be kept very low to minimize the potential for confusion at higher layers of the ATM communications protocol. Furthermore, show-thru presents a security threat to the information in the uplink burst for beam B. In other words, neighboring quiescent channels may actually decode (and ultimately send to unintended recipients) an uplink burst intended for a completely different receiver. Show-thru thus undesirably and unnecessarily utilizes satellite resources, permits unauthorized usage of the uplink beam, and compromises the security in the transmitted data.

Therefore, a need is present in the industry for an improved satellite communications system which overcomes the disadvantages discussed above and previously experienced.

BRIEF SUMMARY OF THE INVENTION

It is an object of the present invention to greatly reduce the likelihood of successfully decoding show-thru signals.

Another object of the present invention is to provide a simple and effective method of reliably discarding show-thru signals at a receiver.

It is another object of the present invention to greatly reduce the likelihood of successfully decoding show-thru signals without adding overhead to uplink bursts.

One or more of the foregoing objects is met in whole or in part by a method for preventing show-thru among uplink beams transmitted to a satellite. The method includes the steps of selecting a scrambling sequence A and selecting a scrambling sequence B differing from the scrambling sequence A. The method then applies the scrambling sequence A to uplink A data to form scrambled uplink A data and further applies the scrambling sequence B to uplink B data to form scrambled uplink B data. The uplink A and the uplink B are thereby differentiated and have vastly improved resistance to show-thru. The scrambled uplink A data and the scrambled uplink B data are then transmitted to a receiver, for example, onboard a satellite.

The method also codes the uplink A data and the uplink B data prior to scrambling. The coding, in general, applies an error correcting code capable of correcting T errors. Preferably, the scrambling sequence B differs from the scrambling sequence A in more than T locations to prevent a decoder for uplink A from correcting errors generated in the decoder by scrambling sequence B.

The method is generally applicable to numerous same color uplink beams in a coverage area. Thus, the method may operate on additional uplink beams, for example, an uplink beam C. As with uplink beams A and B, the method selects a scrambling sequence C differing from the other scrambling sequences. The uplink C data is then coded and the scrambling sequence C is applied. The resultant uplink beam C thereby benefits from increased resistance to show-thru from uplink beams A and B, uplink B resists show-thru from uplink beams A and C, and uplink A resists show-thru from uplink beams B and C.

In applying the scrambling sequences to the uplink data, the method may use an exclusive-or operation. In applying the coding, the method may use a Reed-Solomon code, and in particular a (236, 212) Reed-Solomon code (T=12) particularly suitable for 53-byte Asynchronous Transfer Mode (ATM) cells. No extra uplink data is added with the exclusive-or operation and only a minimal additional processing step is used before transmission. Furthermore, the method is compatible with established error correcting decoding techniques, for example, Reed-Solomon decoding.

DETAILED DESCRIPTION OF THE INVENTION

Figure 1:
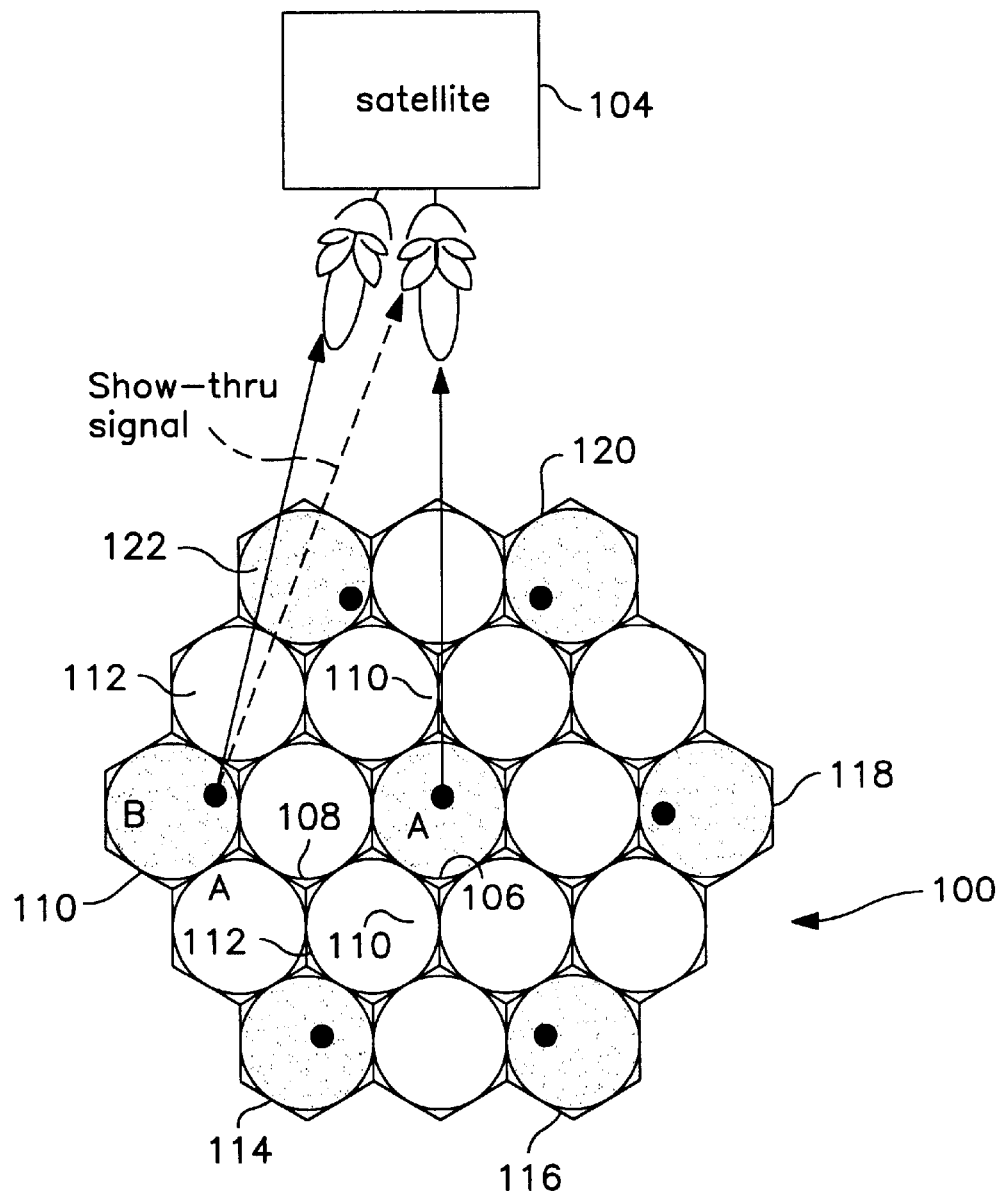
FIG. 1 illustrates an example of a frequency reuse plan susceptible to show-thru.

Turning now to the drawings, FIG. 1 illustrates a satellite cellular communication system 100 including a frequency reuse plan 102 generated by a satellite 104. The frequency reuse plan 102 may make use of multiple frequencies and polarizations (for example, differently colored beams A and A* in FIG. 1) to reduce interference between cells. The reuse plan 102 includes multiple cells 106–112, for example, that correspond to spot beams separately produced (as downlinks) and received (as uplinks) by the satellite 104 and user earth terminals (UETs) present in the cells 106–112.

FIG. 1 shows that multiple identically colored beams may exist in the frequency reuse plan 102. For example, the cells 106 (supported by beam A) and 110 (supported by beam B) share the same color and are therefore candidates for CCI and show-thru. Furthermore, it is noted that there may be numerous additional same color cells in the frequency reuse plan 102. For example, the cells 114–122 all share the same color as the cells 108 and 110. Thus, although the discussion below proceeds with reference to beams A and B, it is noted that the techniques discussed below are also applicable to numerous additional same color beams in any frequency reuse plan.

Figure 2:
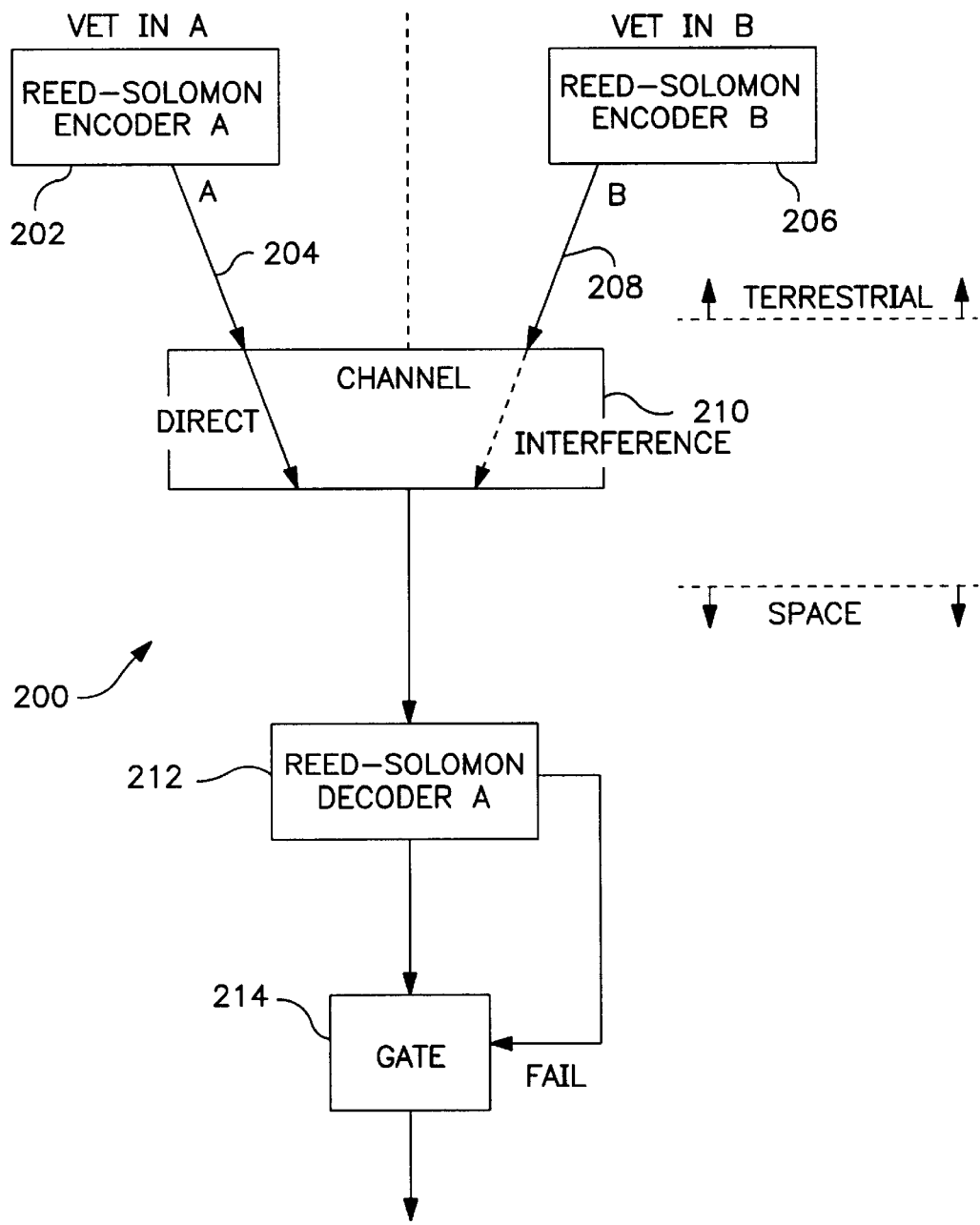
FIG. 2 illustrates a transmitter and receiver hardware configuration that generates uplinks susceptible to show-thru.

Turning now to FIG. 2, that figure shows a block diagram of a communication system 200. The communication system 200 includes an uplink A encoder 202 for a UET generating an uplink A 204, and an uplink B encoder 206 for a UET generating an uplink B 208. The transmission channel 210 as well as an uplink A decoder 212 and a gate circuit 214 are also shown in FIG. 2.

In the situation where the uplink A 204 and the uplink B 208 are both active (e.g., both uplinks include actively transmitted uplink signals), show-thru is less likely. Show-thru is less likely because the signals received at the receiver electronics for uplink A 204 are signals dominated by the actively transmitted uplink signals in the uplink A 204. Thus, the uplink A decoder 212 may accurately decode the received uplink A signal.

Note, however, that the received uplink A signal may still include errors, possibly generated from CCI due to the uplink B signals. The signal received, however, is substantially that of the uplink A, possibly tainted by CCI or other interference. The uplink A decoder 212 is able to correct up to T errors, and may be, for example, a (236, 212) Reed-Solomon decoder with T=12. The uplink A decoder 212, in general, decodes the coding applied by the uplink A coder 202, which may, for example, apply a (236, 212) Reed-Solomon code, BCH code, or other error correcting code. Beyond T errors, however, the decoder 212 cannot correct the received uplink signals and asserts a "decoder failure."

The gate circuitry 214 generally is responsive to the uplink A decoder 212 and its assertions or non-assertions of decoder failure. Thus, for example, the gate circuitry 214 may pass the decoded uplink signals to subsequent processing elements or discard the decoded uplink signals (upon decoder failure). In general, it is noted that any of the circuitry or functions discussed or shown in the figures may be implemented in a variety of ways. Thus, for example, the uplink A encoder 202, uplink A decoder 212, or gate circuitry 214 may be created using combinatorial logic, ASICs, through software executed by a CPU, a DSP chip, or the like. The foregoing elements may be part of hardware that is used to perform other operational functions at a UET or a satellite.

Continuing with reference to FIG. 2, in the scenario in which the uplinks are not both actively transmitting, show-thru becomes much more likely. Thus, for example, if the uplink A 204 is silent (e.g., no signals are being actively transmitted in the uplink A 204), a weak signal from the uplink B 208 plus thermal noise is present at the reception electronics for the uplink A 204. In many instances, the weak signal as received will contain so many errors (e.g., more than T errors) that the uplink A decoder 212 will assert decoder failure.

However, the uplink A decoder 212 will occasionally succeed in correcting the weak signal from B due to the effective error correcting code applied on all uplink signals. Because the actual receiver and decoder for the uplink A 204 are unaware that the weak signal originated in another beam, a correctly decoded data from the uplink B 208 is periodically recovered and considered part of the uplink A 204 data stream. Thus, in the case where ATM cells are transmitted, a cell misinsertion results, and in general the privacy of the uplink B data is compromised. The frequency of occurrence of show-thru, although small, may be orders of magnitude higher than is acceptable to meet the Cell Misinsertion Ratio (CMR) criteria of an ATM system.

Figure 3:
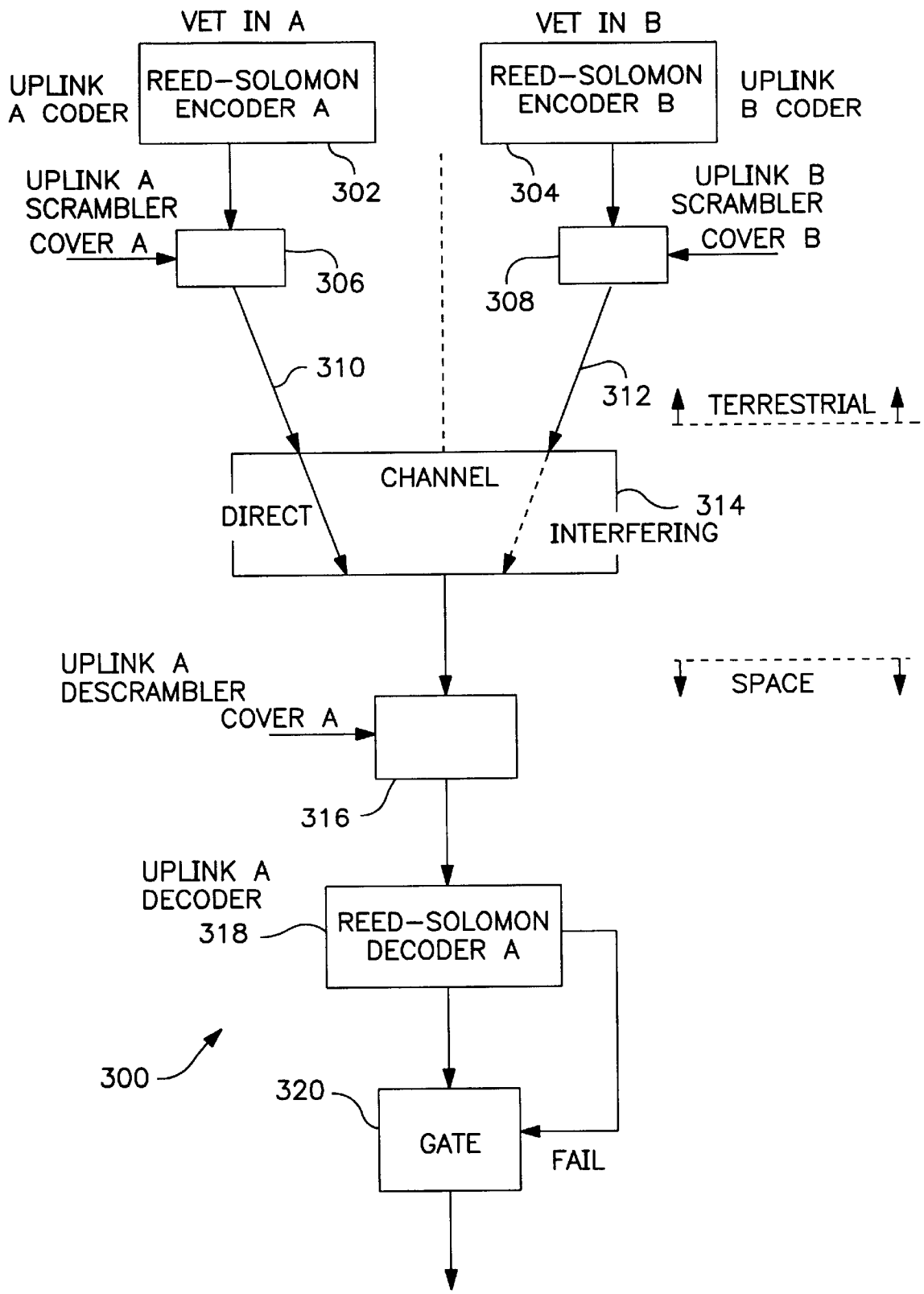
FIG. 3 shows a transmitter and receiver hardware configuration that generates uplinks with vastly improved resistance to show-thru.

Turning now to FIG. 3, that figure illustrates a communication system 300 according to a preferred embodiment of the present invention. The communication system 300 includes an uplink A coder 302, an uplink B coder 304, an uplink A scrambler 306, and an uplink B scrambler 308. The uplink A 310, uplink B 312, and the communication channel 314 are also illustrated. Included at a receiver intended for the uplink A 310 is an uplink A descrambler 316, an uplink A decoder 318, and a gate circuit 320.

The uplink A coder 302, uplink B coder 304, uplink A decoder 318, and gate circuit 320 function substantially as described above with respect to the corresponding elements of FIG. 2. Note the introduction, however, of the uplink A scrambler 306 and the uplink B scrambler 308. As will be described in more detail below, the scrambling sequences applied to the uplink data will provide increased resistance to show-thru in the communications system 300.

In general, the uplink A scrambler 306 applies a cover sequence or scrambling sequence A to uplink A data, and the uplink B scrambler 308 applies a scrambling sequence B to uplink B data. Note that, before scrambling, any of the uplink data may be subjected to additional coding including inner coding to form a concatenated code. The scramblers 306 and 308, as well as the descrambler 318 may, for example, be implemented as exclusive-or circuitry (or software) that XORs a scrambling sequence with uplink data. The scrambling sequences thereby add no extra overhead information to the uplink data, but provide increased resistance to show-thru as explained below.

Preferably, the scrambling sequences are chosen to have a small cross-correlation between any two sequences for different same-color beams. For example, portions of different phases of the same maximal length (ML) sequence (i.e. cyclic shifts of the same underlying ML sequence) may be used as a scrambling sequences because the different phases tend to differ in roughly half of their bits. In general, each scrambling sequence preferably differs from each other scrambling sequence in more than T locations (i.e., the minimum distance between scrambling sequences should be greater than T) to prevent, for example, an uplink A decoder from correcting scrambled uplink B data.

The scrambled uplink A data is transmitted through the channel 314 to a satellite. At the satellite, after demodulation and any other necessary preliminary steps (such as decoding an inner code, if present), the scrambled A data (including transmission errors due to noise, CCI, and other effects), is descrambled by the uplink A descrambler 316. For example, the uplink A descrambler 316 may descramble the uplink A data by exclusive-oring the scrambling sequence A (applied at the UET) with the received uplink A signal. The resultant descrambled uplink A data is then presented to the uplink A decoder 318.

Because the exclusive-or process is self inverting (i.e., S XOR S=0 for any S), the descrambled uplink A data presented to the uplink A decoder 318 is identical to what would have been presented if no scrambling sequence had been applied (i.e., A XOR S XOR S=A). As noted above, when both uplinks are active, the signals from uplink A 310 dominate at the uplink A receiver, and decoding proceeds without serious threat of show-thru.

However, when uplink A 310 has no burst present in a time slot where uplink B 312 does have a burst present (i.e., uplink A 310 is inactive), the scramblers 306, 308 provide a vast reduction in the likelihood of show-thru. Note that the scrambling sequence B differs in, preferably, more than T positions from the scrambling sequence A. Thus, when a weak (show-thru) signal from the uplink B 312 appears in the uplink A receiver electronics, the uplink A descrambler 318, in applying the scrambling sequence A, creates a large number of apparent errors in the descrambled data presented to the uplink A decoder 318.

For the coders and decoders typically used with communication satellites, the probability of correct decoding for an uplink signal having many errors is very small. Thus, in virtually all situations, the uplink A decoder 318, during show-thru, asserts decoder failure, in which case the show-thru uplink signal is discarded by the gate circuit 320. Thus, with extremely high probability, show-thru uplink signals are rejected by the uplink A receiver electronics and, for example, misinsertion is prevented and the integrity of the uplink B data is preserved.

As a quantitative example, consider the case where the uplink A coder 302 is a Reed-Solomon byte oriented coder (e.g., over a 256 element Galois Field, GF(256)), of length 236 bytes and capable of correcting any 12 byte errors (T=12). A potential show-thru block will reach the uplink A decoder 318 with most of its 236 (byte) symbols in error because of being uncovered by the scrambling sequence A rather than the scrambling sequence B. The probability that the uplink A decoder 318 will not assert decoder failure when presented with a large number of apparent errors is less than one part per billion, consistent with typical requirements for CMR. It is significant to note that the degree of protection against show-thru afforded by the invention is essentially independent of the amount of CCI, since the invention does not depend in any way on the show-thru being weak but only on the fact that the scrambling sequences differ significantly.

Figure 4:
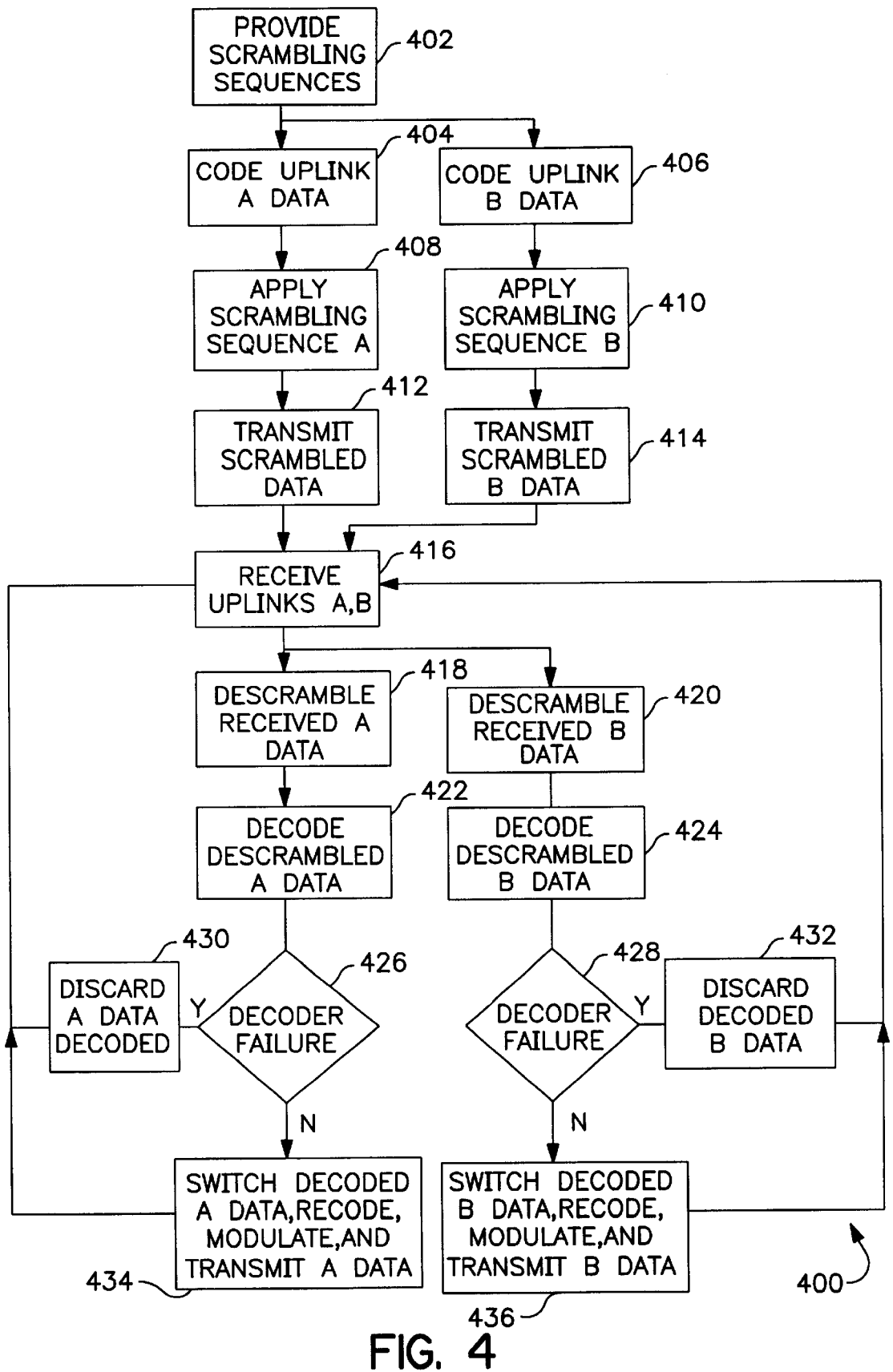
FIG. 4 depicts a high level flow diagram of uplink transmission and reception according to the present invention.

Turning now to FIG. 4, that figure shows a high level flow diagram 400 of one implementation of the present invention. The diagram 400 generally shows the steps performed on the ground, including a providing step 402, coding steps 404, 406, scrambling steps 408, 410, and transmission steps 412, 414. The diagram 400 also shows the steps occurring at a receiver, for example, a satellite, including a receiving step 416, descrambling steps 418, 420, decoding steps 422, 424, and decoder decisions steps 426, 428. Discarding steps 430, 432, and retransmission steps 434 and 436 are also illustrated.

At the providing step 402, scrambling sequences are provided for each same color uplink beam, for example, using predetermined or shift register produced ML sequences. The providing step 403 may occur, for example, at a Network Operation and Control Center (NOC), which may then distribute scrambling sequences to individual UETs. At coding steps 406 and 408, one or more UETs encode uplink A data and uplink B data, for example using a Reed-Solomon code, optionally followed by an inner code. At the scrambling steps 408 and 410, a scrambling sequence A is applied to the coded uplink A data and a scrambling sequence B is applied to the coded uplink B data. Subsequently, the scrambled uplink A and B data are transmitted in an uplink A and an uplink B at steps 412 and 414, respectively.

The receiver receives one or more of the uplinks A and B at step 416. Typically, the received uplink A and B signals are subjected to demodulation and additional processing (not shown) to generate baseband uplink A data and uplink B data. The received uplink A data and the received uplink B data are descrambled at steps 418 and 420, respectively. During descrambling, for example, the scrambling sequences A and B applied at steps 408 and 410 may be reapplied using a reversible process (e.g., an exclusive-or circuit). The resultant descrambled A and B data are applied to decoders at the decoding steps 422 and 424 which generate decoded A data and decoded B data, respectively.

As noted above, decoder failure results with very high probability during show-thru (and, in general, whenever more than T errors are present in the data input to the decoder). At decision steps 426 and 428, the receiver checks for decoder failure, and if asserted, discards the decoded A or B data. Processing continues at the reception step 416.

On the other hand, the absence of decoder failure is an extremely good indication that, as the case may be, the decoded A data or the decoded B data is correct data intended to be received by the uplink A receiver or the uplink B receiver. Thus, at retransmission step 434, the resultant correct decoded A data may be switched, recoded, remodulated, and retransmitted to any appropriate destination. Similarly, at retransmission step 436, the resultant correct decoded B data may be switched, recoded, remodulated, and retransmitted to any appropriate destination.

The present invention may be efficiently implemented in practice because multiple variants of an ML sequence, or a portion thereof, may all be produced from the same shift register by changing only the starting state. The encoder at the UET (e.g., the uplink A encoder 302) and the matching decoders (e.g., the uplink A decoder 318) at the satellite are commonly present in modern satellite communications systems and blend seamlessly with the scrambling and descrambling of the present invention.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. A method for detecting show-thru in an uplink A due to an uplink B at a satellite receiver, the method comprising:

storing a plurality of scrambling sequences associated with individual uplinks, including a scrambling sequence A;

receiving uplink A signals present at an uplink A receiver;

applying said scrambling sequence A to said uplink A signals to generate descrambled A data;

decoding said descrambled A data, wherein said step of applying comprises applying said scrambling sequence A using an exclusive-or operation, wherein said decoding step further comprises the step of generating a decoder failure signal; and discarding said descrambled A data when said decoder failure signal is asserted.

2. The method of claim 1, further comprising the step of retransmitting said descrambled A data when said decoder failure signal is unasserted.

3. The method of claim 1, wherein said step of decoding comprises Reed-Solomon decoding.

4. The method of claim 3, wherein said step of decoding comprises decoding with a (236, 212) Reed-Solomon code.

5. The method of claim 1, wherein the step of storing a plurality of scrambling sequences comprises:

storing a scrambling sequence B that differs from scrambling sequence A in more than T locations, where T is the number of errors able to be corrected in the decoding step.

6. A satellite communications system providing increase resistance to show-thru, said satellite communication system comprising:

an uplink A coder;

an uplink A scrambler including an exclusive-OR circuit for combining coded uplink A data with an uplink A scrambling sequence;

an uplink B coder;

an uplink B scrambler including an exclusive-OR circuit for combining coded uplink B data with an uplink B scrambling sequence;

a transmitter for transmitting scrambled uplink A data and scrambled uplink B data; and a receiver for receiving at least one of scrambled uplink A data and scrambled uplink B data, wherein the receiver comprises a descrambler to which one of the scrambling sequences is applied, a decoder for decoding the unscrambled data from the descrambler, the decoder including means for generating a decoder failure signal if the decoder is unable to correct all data errors in the descrambled data, and means for discarding descrambled data when the decoder failure signal is asserted.

7. A satellite communications system as defined in claim 6, wherein the receiver further comprises means for retransmitting the descrambled and decoded data when the decoder failure signal is unasserted.

8. A satellite communications system as defined in claim 6, wherein the decoder is a Reed-Soloman decoder.

9. A satellite communications system as defined in claim 6, wherein the uplink B scrambling sequence B differs from the uplink A scrambling sequence in more than T locations, where T is the number of errors able to be corrected by the decoder.

* * * * *